United States Patent
Wing et al.

(10) Patent No.: US 7,519,570 B2
(45) Date of Patent: Apr. 14, 2009

(54) LOCALIZATION OF GENERIC ELECTRONIC REGISTRATION SYSTEM

(75) Inventors: Andrew William Wing, Oakville (CA); Steve Brackenbury, Toronto (CA); Donald Michael Henning, Toronto (CA); Mary Catherine Roberts, Mississauga (CA)

(73) Assignee: Teranet Enterprises Ltd., Toronto, Ontario (CA)

( * ) Notice: Subject to any disclaimer, the term of this patent is extended or adjusted under 35 U.S.C. 154(b) by 396 days.

(21) Appl. No.: 10/232,804

(22) Filed: Aug. 30, 2002

(65) Prior Publication Data

US 2004/0044638 A1  Mar. 4, 2004

(51) Int. Cl.
*G06F 7/00* (2006.01)
*G06F 17/30* (2006.01)

(52) U.S. Cl. .............. 707/1; 707/10; 707/102; 715/224; 715/234

(58) Field of Classification Search .......... 707/1–10, 707/100–104.1, 200–206, 228; 709/217, 709/219, 226, 228, 229; 715/817, 221–225, 715/234; 705/54
See application file for complete search history.

(56) References Cited

U.S. PATENT DOCUMENTS

| | | | |
|---|---|---|---|
| 4,989,144 A | 1/1991 | Barnett | 364/419 |
| 5,241,466 A | 8/1993 | Perry et al. | 364/401 |
| 5,899,978 A | 5/1999 | Irwin | 705/1 |
| 6,076,064 A | 6/2000 | Rose | 705/1 |
| 6,314,408 B1* | 11/2001 | Salas et al. | 705/54 |
| 6,757,663 B1* | 6/2004 | Rogers et al. | 705/24 |
| 6,792,462 B2* | 9/2004 | Bernhardt et al. | 709/225 |
| 6,947,941 B1* | 9/2005 | Koon | 707/100 |
| 2001/0049606 A1 | 12/2001 | Lucarelli | 705/1 |
| 2002/0129013 A1* | 9/2002 | Thomas | 707/3 |

FOREIGN PATENT DOCUMENTS

| | | |
|---|---|---|
| CA | 235647 | 11/1923 |
| CA | 2332211 A1 | 7/2001 |
| GB | 2196451 A | 4/1988 |
| WO | 99/18818 | 4/1999 |
| WO | 00/55774 | 9/2000 |

OTHER PUBLICATIONS

Matic et al., pen-based visitor registration system, 1995, pp. 298-302.*
Safari et al., Affine point pattern matching and its application to form registration, May 12-15, 1996, IEEE, vol. 2, 656-659.*
Safari et al., Form registration: a computer vision approach, Aug. 18-20, 1997, IEEE, vol. 2, 758-761.*

* cited by examiner

*Primary Examiner*—Jean B Fleurantin
(74) *Attorney, Agent, or Firm*—Patterson & Sheridan, LLP

(57) ABSTRACT

The invention provides a method of localizing an electronic registration system provided through a generic registration framework, the method includes using several interfaces (capturing interface, template interface, workflow interface, rules interface) to customize the registration requirements and processing for a particular registration application. The method generates a geographically-meaningful localization of a registration system. The invention protects and respects the history of the data.

19 Claims, 10 Drawing Sheets

INSTRUMENT

*COMPONENT DATABASE TABLE*

| | ID | TYPE | NAME | DESCRIPTION | STATUS | CERTIFIED | CREATEDATE | EFFECTIVEDATE |
|---|---|---|---|---|---|---|---|---|
| 602 | 217 | ChargeOrMortgage | 123 | | AC | 0 | 7/5/2002 | 7/5/2002 |
| 603 | 266 | ChargeOrMortgage | 0 p n e nbm BR12345 | | AC | 0 | 7/9/2002 | 7/9/2002 |
| 604 | 301 | ChargeOrMortgage | Charge test | | AC | 0 | 7/9/2002 | 7/9/2002 |
| 605 | 302 | DischargeOfCharge | cnnch test | | AC | 0 | 7/9/2002 | 7/9/2002 |
| 606 | 392 | TitleTransfer | Instrument 4 | | AC | 0 | 7/16/2002 | 7/16/2002 |
| 607 | 397 | ChargeOrMortgage | description | instrument table is messing cli | AC | 0 | 7/16/2002 | 7/16/2002 |
| 608 | 501 | TitleTransfer | Jalena | testing final release V3.7 | AC | 0 | 7/23/2002 | 7/23/2002 |
| 609 | 521 | TitleTransfer | July 24 | testing async process | AC | 0 | 7/24/2002 | 7/24/2002 |
| 610 | 523 | ChargeOrMortgage | async on a xx | test - July 24, 2002 | AC | 0 | 7/24/2002 | 7/24/2002 |
| 611 | 527 | DischargeOfCharge | del | adg | AC | 0 | 7/25/2002 | 7/25/2002 |
| 612 | 528 | DischargeOfCharge | b | dgh gh | AC | 0 | 7/25/2002 | 7/25/2002 |
| 613 | 529 | TitleTransfer | s | dhj | AC | 0 | 7/25/2002 | 7/25/2002 |
| 614 | 530 | DischargeOfCharge | sgfh | sdfj | AC | 0 | 7/25/2002 | 7/25/2002 |
| 615 | 533 | TitleTransfer | gh | f | AC | 0 | 7/30/2002 | 7/30/2002 |
| 616 | 532 | TitleTransfer | w | | AC | 0 | 7/30/2002 | 7/30/2002 |
| 617 | 535 | TitleTransfer | tc 12 | adfgh | AC | 0 | 7/31/2002 | 7/31/2002 |
| 618 | 536 | DischargeOfCharge | j chg db j | dfh tr | AC | 0 | 7/31/2002 | 7/31/2002 |
| 619 | 537 | DischargeOfCharge | 7667 | mkl | AC | 0 | 7/31/2002 | 7/31/2002 |

(601)

*ATTRIBUTE DATABASE TABLE*

| | COMPONENTID | ID | PARENTID | ISCOLLECTION | STRINGVALUE | EFFECTIVEDATE | ATTRNAME | ATTRTYPE | STATUS |
|---|---|---|---|---|---|---|---|---|---|
| 621 | 217 | 3001 | 0 | 1 | | 7/5/2002 | ChargeOrMortgage | aggregate | A |
| 622 | 217 | 3002 | 3001 | 1 | | 7/5/2002 | DocHeader | aggregate | A |
| 623 | 217 | 3003 | 3002 | 0 | Registry | 7/5/2002 | regType | java.lang.String | A |
| 624 | 217 | 3004 | 3002 | 0 | gfh | 7/5/2002 | propertyidentifiers | java.lang.String | A |
| 625 | 217 | 3005 | 3002 | 0 | 645 | 7/5/2002 | principalAmount | java.lang.Double | A |
| 626 | 266 | 3901 | 0 | 1 | | 7/9/2002 | ChargeOrMortgage | aggregate | A |
| 627 | 266 | 3902 | 3901 | 1 | | 7/9/2002 | DocHeader | aggregate | A |
| 628 | 266 | 3903 | 3902 | 0 | Registry | 7/9/2002 | regType | java.lang.String | A |
| 629 | 266 | 3904 | 3902 | 0 | 606 | 7/9/2002 | principalAmount | java.lang.Double | A |
| 630 | 301 | 3953 | 3952 | 0 | Registry | 7/9/2002 | regType | java.lang.String | A |
| 631 | 301 | 3954 | 3952 | 0 | 567 | 7/9/2002 | principalAmount | java.lang.Double | A |
| 632 | 301 | 3955 | 3952 | 0 | tryu | 7/9/2002 | description | java.lang.String | A |
| 633 | 301 | 3956 | 3951 | 0 | Redescription | 7/9/2002 | DocumentContent | java.lang.String | A |
| 634 | 302 | 4000 | 0 | 1 | | 7/9/2002 | DischargeOfCharge | aggregate | A |
| 635 | 302 | 4001 | 4000 | 1 | | 7/9/2002 | DocHeader | aggregate | A |
| 636 | 302 | 4002 | 4001 | 0 | Registry | 7/9/2002 | regType | java.lang.String | A |
| 637 | 302 | 4003 | 4001 | 0 | skj | 7/9/2002 | description | java.lang.String | A |
| 638 | 392 | 5101 | 0 | 1 | | 7/16/2002 | TitleTransfer | aggregate | A |
| 639 | 392 | 5102 | 5101 | 1 | | 7/16/2002 | DocHeader | aggregate | A |
| 640 | 392 | 5103 | 5102 | 0 | sfgj | 7/16/2002 | action | java.lang.String | A |
| 641 | 392 | 5104 | 5102 | 0 | e | 7/16/2002 | submittingParty | java.lang.String | A |
| 642 | 397 | 5146 | 0 | 1 | | 7/16/2002 | ChargeOrMortgage | aggregate | A |
| 643 | 397 | 5147 | 5146 | 1 | | 7/16/2002 | DocHeader | aggregate | A |
| 644 | 397 | 5148 | 5147 | 0 | Registry | 7/16/2002 | regType | java.lang.String | A |
| 645 | 397 | 5149 | 5147 | 0 | asfgafgh | 7/16/2002 | description | java.lang.String | A |

REGISTER

COMPONENT DATABASE TABLE

| ID | TYPE | NAME | STATUS | CERTIFIED | CREATEDATE | EFFECTIVEDATE | CERTIFYDATE | LOCKED |
|---|---|---|---|---|---|---|---|---|
| 101 | pin | property a | A | 0 | 7/2/2002 | 7/2/2002 | 7/2/2002 | |
| 102 | pin | property b | A | 0 | 7/2/2002 | 7/2/2002 | 7/2/2002 | |

ATTRIBUTE DATABASE TABLE

| COMPONENTID | ID | PARENTID | ISCOLLECTION | STRINGVALUE | EFFECTIVEDATE | ATTRNAME | ATTRTYPE | STATUS |
|---|---|---|---|---|---|---|---|---|
| 102 | 3923 | 3922 | 1 | | 7/9/2002 | Party | aggregate | A |
| 102 | 3925 | 3922 | 1 | Manon | 7/9/2002 | Spouse | java.lang.String | A |
| 102 | 3926 | 3925 | 0 | Bob | 7/9/2002 | name | java.lang.String | A |
| 102 | 3927 | 3922 | 1 | | 7/9/2002 | Address | aggregate | A |
| 102 | 3928 | 3927 | 0 | Alberta | 7/9/2002 | prov | java.lang.String | A |
| 102 | 3929 | 3927 | 0 | Cold Lake | 7/9/2002 | city | java.lang.String | A |
| 102 | 3930 | 3927 | 0 | Main | 7/9/2002 | street | java.lang.String | A |
| 102 | 3931 | 3927 | 0 | J8F 3E4 | 7/9/2002 | postalcode | java.lang.String | A |

Fig. 7

GEOGRAPHIC

COMPONENT DATABASE TABLE

| ID | DESCRIPTORTYPE | VALUE | PARENTID | DESCRIPTION | CREATEDATE | GEOTYPE |
|---|---|---|---|---|---|---|
| 1 | country | Canada | | A country up north | 7/5/2002 | 1 |
| 2 | province | Ontario | 1 | A big province | 7/6/2002 | 2 |
| 3 | city | Toronto | 2 | A big city | 7/7/2002 | 3 |
| 4 | street | Yonge | 3 | A very long street | 7/8/2002 | 4 |
| 5 | number | 55 | 4 | | 7/9/2002 | 5 |
| 6 | city | Brampton | 2 | City | 7/10/2002 | 3 |
| 7 | city | Milton | 2 | Small town | 7/11/2002 | 3 |
| 8 | street | Queen | 6 | Busy street | 7/12/2002 | 4 |
| 9 | street | Mill | 7 | Street with a pond | 7/13/2002 | 4 |
| 10 | number | 23 | 8 | | 7/14/2002 | 5 |

ATTRIBUTE DATABASE TABLE

| COMPONENTID | ID | PARENTID | ISCOLLECTION | STRINGVALUE | EFFECTIVEDATE | ATTRNAME | ATTRTYPE | STATUS |
|---|---|---|---|---|---|---|---|---|
| 4 | 301 | | 0 | 2 | 7/9/2002 | number of wells | java.lang.Integer | A |
| 4 | 302 | | 1 | | 7/9/2002 | Well Location | aggregate | A |
| 4 | 303 | 302 | 0 | 41d 22m 30s | 7/9/2002 | well 1 | java.lang.String | A |
| 4 | 304 | 302 | 0 | 81d 52m 30s | 7/9/2002 | well 2 | java.lang.String | A |
| 8 | 301 | | 0 | 0 | 7/9/2002 | number of wells | java.lang.Integer | A |

LOCALIZATION OF GENERIC ELECTRONIC REGISTRATION SYSTEM

BACKGROUND OF THE INVENTION

1. Field of the Invention

The invention relates to registration methods and systems, and more particularly, to electronic registration methods and systems.

2. Description of the Related Art

Registration systems have existed in some fashion since ancient times. In its most basic form, registration is a process by which individuals, items or transactions are recorded in a list (or register). Registration systems may be in electronic or paper form, or some combination thereof.

SUMMARY OF THE INVENTION

Two underlying actions can be said to distinguish a registration transaction from mere record-keeping. Registration includes:

1. Preparation, and lodgement/submission of a thing to be registered; and
2. Committal/acceptance of the thing to be registered (usually, acceptance is done by some type of registration authority).

Some types of registration systems presume official validation or certification of contents (such as, land, passport, guns, automobile registration, patents), while others are mere depository systems, placing the onus for accuracy of contents on the individual user (such as, product registrations, email registration, subscriptions). While registration systems are most common in official or government settings (such as, health care, firearms registration, vehicle registration, real or personal property), there are also many types of private registration systems (such as, product registrations, domain name registration, educational institution registrations). Perhaps the most common application for registration systems is for ownership tracking of real, personal or intellectual property. However, there are countless other possible uses.

As registration systems exist in a temporal framework, they must permit not only insertion of new entries into the register, but also amendment or deletion of existing entries. Typically, registration systems also must be organized in some logical sense to permit searching of existing entries according to some criteria. Examples of such searchable criteria include:

a) item description/name, location, price, identifying number/name, time b) model, make, serial number Rules are inherent in the registration system to "process" a submission for registration. Acceptance criteria may be formal and/or content based. For instance, to accept a passport application, the applicant's photograph must be a certain size and shape (formal criterion). On the other hand, there are acceptance criteria that involve judgement about the content, which processing would ordinarily be carried out by a human checker. For instance, to register as a university student, one needs to have graduated from high school.

Increasingly, registration systems are being provided in some degree in electronic form. One or more aspects may be electronically provided. Typically, the register itself may be electronic (i.e. in database form). Searchable electronic databases are known in the art.

The submission (or lodgement) process may also be electronic (i.e., e-mail or form-based submission).

Lodgement processes (that is, the preparation and submission of an instrument for registration) are known in electronic registration systems. For instance, in Teranet's e-reg® product, lodgement provides users with a virtual work area allowing parties to collaborate amongst themselves prior to submitting the instrument (in this case, a land registration document) for validation and registration.

Content-based processing is the most difficult aspect to represent in electronic form, as it requires programming of the checklist of criteria that would be manually completed by a human checker. As these rules and criteria will be particular to each application (and to each registration authority), a significant amount of custom programming is required. For registration systems where rules are changing on an evolutionary basis (e.g. where regulatory changes are frequent), the task of custom programming is an ongoing one.

It would be advantageous to provide an electronic registration system that allows a registration system provider to configure and reconfigure detailed rules and criteria as necessary for ongoing operation, without significant "hard coding" at the program level.

SUMMARY OF THE INVENTION

It is an object of the invention to provide a middleware framework for developing and providing electronic registration services. Through this framework, it is a further object of the invention to allow localization of generic registration utilizing tools within the framework to allow electronic registration to be customized for particular applications and revised as needed. Finally, it is an object of the invention to provide a geographically-meaningful localization of generic registration framework by the use of a geographic (location) entity in the configuration of the localized registration database.

According to a first aspect of the invention, a method is provided for localizing an electronic registration system provided through a generic registration framework. The registration system has register, instrument and geographic entities within a database in a computer memory. The method comprises at least four steps:

by means of a capturing interface, defining register, instrument and geographic entities for defining register, instrument and geographic entities to be stored in the database;

by means of a template interface, defining input parameters for defining input parameters to accept input information through forms;

by means of a workflow interface, selecting an order of registration operations for selecting an order of registration operations to be performed on the input information; and by means of a rules interface, defining rules for processing the input information to be applied against an attribute of any one of the register, instrument and geographic entities.

The step of defining register, instrument and geographic entities may further include defining data fields for the register, instrument and geographic entities. In addition, or in the alternative, data fields may be populated with existing data. The data fields are preferably defined or expressed in XML.

The geographic entity is preferably a hierarchically-expressed geographic indicator.

It may have a dynamically selected number of levels.

The step of defining register, instrument and geographic entities may further include linking existing systems to the register, instrument and geographic entities to provide an ongoing supply of fresh data.

The capturing interface preferably includes a persistence layer for permitting changes to be made to the database dynamically.

The step of defining input parameters preferably further includes defining the presentation and grouping of the forms.

The step of selecting an order of registration operations preferably further includes selecting from among predetermined business objects.

The step of defining rules preferably further includes defining business objects to serve as arguments for the rules. In addition, or in the alternative, predefined business domain objects may be selected for use in defining rules.

The step of defining rules preferably further includes defining rules with an English grammar. The rules may preferably be defined using an "If . . . Then . . ." syntax.

The method preferably further includes setting prices and collecting monies owed for a registration transaction by means of a pricing/billing module.

The method preferably further includes defining and delivering messaging events by means of a subscription module.

The method preferably further includes defining security protocols to be applied to input information by means of a security module.

The method preferably further includes authorizing users or groups to input, edit, or delete information by means of a customer care module.

Preferably, each one of the register, instrument and geographic entities includes a component table and an attribute table to be stored in the computer memory.

According to a second aspect of the invention, a generic electronic registration system database is provided including register, instrument and geographic entities, each entity comprising:

a component table; and an attribute table.

The database preferably includes XML data.

BRIEF DESCRIPTION OF THE DRAWINGS

In order that the invention may be more clearly understood, the preferred embodiment thereof will now be described by way of example with reference to the accompanying drawings, in which:

FIG. 6 is a table diagram of a sample Instrument entity modelled within the database;

FIG. 7 is a table diagram of a sample Register entity modelled within the database;

FIG. 8 is a table diagram of a sample Geographic entity modelled within the database;

FIG. 10 is an excerpt of a sample form generated from an XML Schema template according to the method;

DETAILED DESCRIPTION

According to the preferred embodiment, the invention provides a method of providing a localized electronic registration system within a generic registration framework that protects and respects the history of the data.

Several key entities form the backbone of the present generic electronic registration framework. Three entities are modeled in the database architecture of the present invention: Register, Instrument and Geographic. These entities are represented in tables in the databases.

Traditionally, a Register is a book where entries for a person, place or thing are listed (usually one abstract per page—each abstract containing multiple entries that represent alterations to the register, such as an addition, deletion, modification, change of state, etc.). In the present sense, a Register is not a physical book, but a virtual book, representing a type of object that is the subject of registration. The system supports a single Register setup, multiple Registers or multiple types of Registers.

The Instrument entity, in the present sense, is not a physical document, but represents an action taken with respect to the object and its corresponding data.

The "register" and "instrument" entities are chosen from the vocabulary of land registration. Likewise, many of the examples used within this description apply to a land registration application of the framework, however, they are meant simply to illustrate one particular complex application of the system. The present framework is generic and is applicable for any type of registration application. Through the localization process described herein, a registration provider specifies the inputs and processing requirements applicable for the particular registration application.

The third entity, a Geographic, does not have an analogous entity in traditional registration systems. A Geographic is a hierarchical description of a location (such as, address or lot, concession, Property Id Number) where any point/level in the hierarchy may be an attribute of a Register or Instrument or may have a Register or attribute as an attribute of itself. (As used herein, an "attribute" can be understood as a conceptual "child" class in relation to a "parent" entity. In the database tables, attribute tables have rows for each child instance of the parent entity. Sub-attributes of attributes may also be provided.) Each level of the hierarchy can be treated as a discrete component representing one or more geographic locations.

Figure 9:
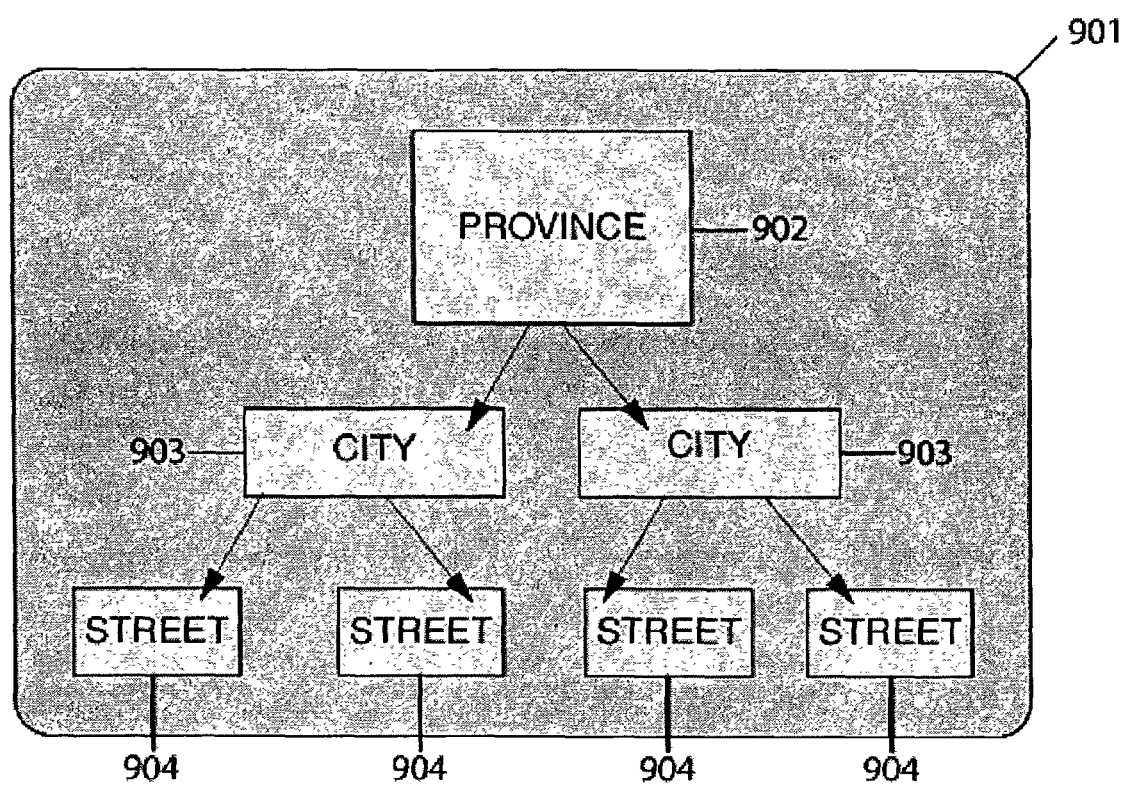
FIG. 9 is a diagram of a sample hierarchical model of the Geographic entity.

A simple Geographic entity 901 is illustrated in FIG. 9. At the top of the hierarchy is the "Province" 902, which has "City" attributes 903, which in turn has "Street" attributes 904. The invention is not limited to the present Geographic illustration however. The framework has no bias as to the components of the Geographic hierarchy. The components are adaptable to the provider's requirements and will represent whatever hierarchy and degree of granularity is meaningful to the subject matter of the registration system.

Registers, Instruments and Geographics may stand in entity-entity or entity-attribute relation to each other. The relationships between the entities are all potentially n-to-n.

To illustrate how these abstract entities might be represented in real situations, consider the following examples:

a) Gun control:
  Register=gun serial number and type;
  Instrument=registered owner;
  Geographic=residence of owner.

b) Vehicle control:
  Register=vehicle VIN, make, model;
  Instrument=registered owner;
  Geographic=residence of owner OR real time location of vehicle.

Figure 2:
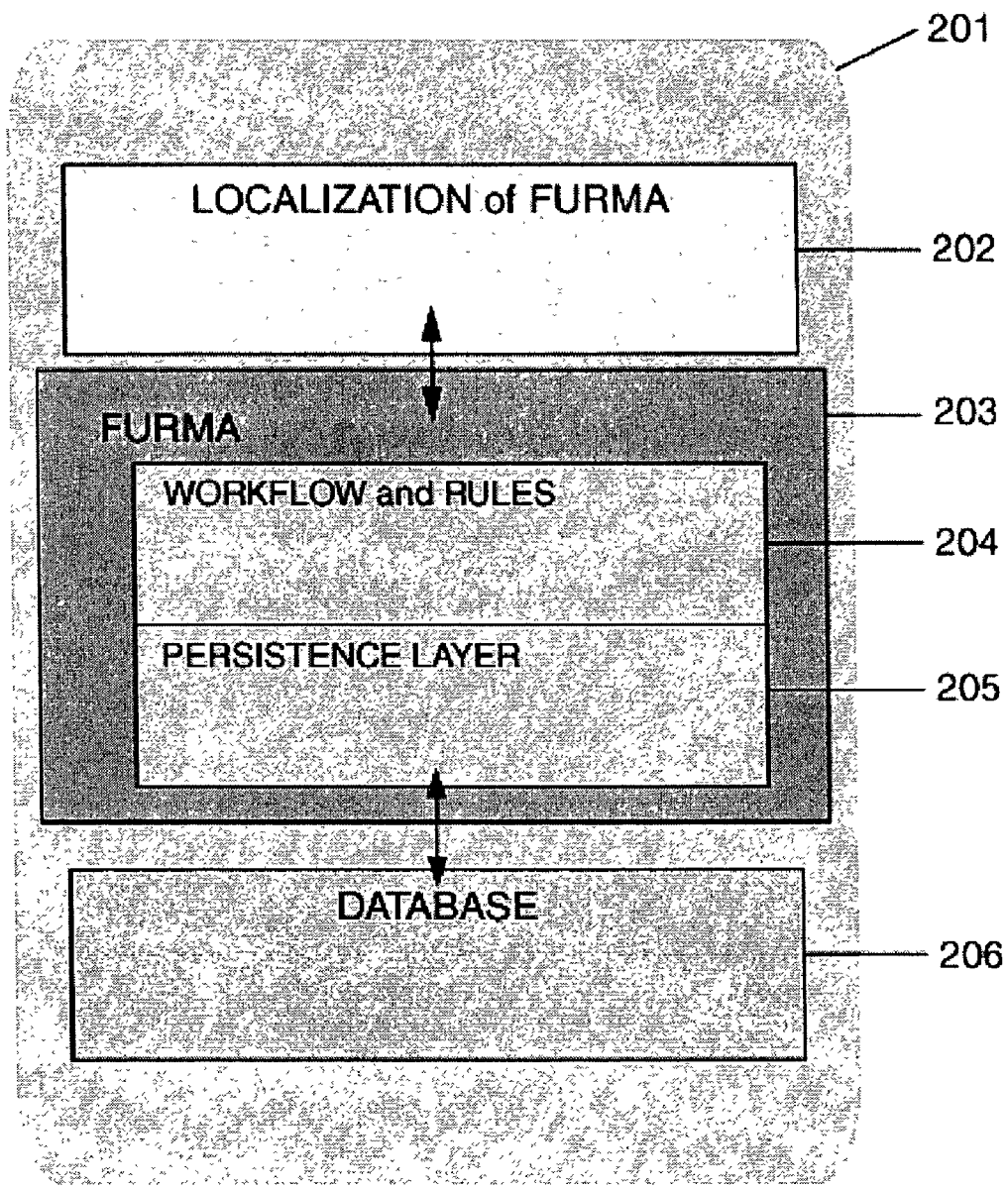
FIG. 2 is a schematic diagram of the middleware architecture of a preferred embodiment of the software used to carry out the invention.

The method relates to a method of providing a localized electronic registration system within a generic registration framework. With reference to FIG. 2, the generic registration framework is a middleware software framework 203. By implication, there is no programmed front-end application for end-users of the registration system. Rather, the framework provides generic access for any type of client application to utilize the framework. A provider of electronic registration services will use the present method to create a front-end application (referred to as a "localization" 202) which is then capable of processing registration transactions through the middleware 203.

The framework 203 is preferably developed using an object-oriented program architecture. The currently preferred architecture is Sun Corporation's Java 2 Enterprise Edition (J2EE™), however, it is not intended to limit the architecture to this language, and any modular development platform would be useful.

Figure 1:
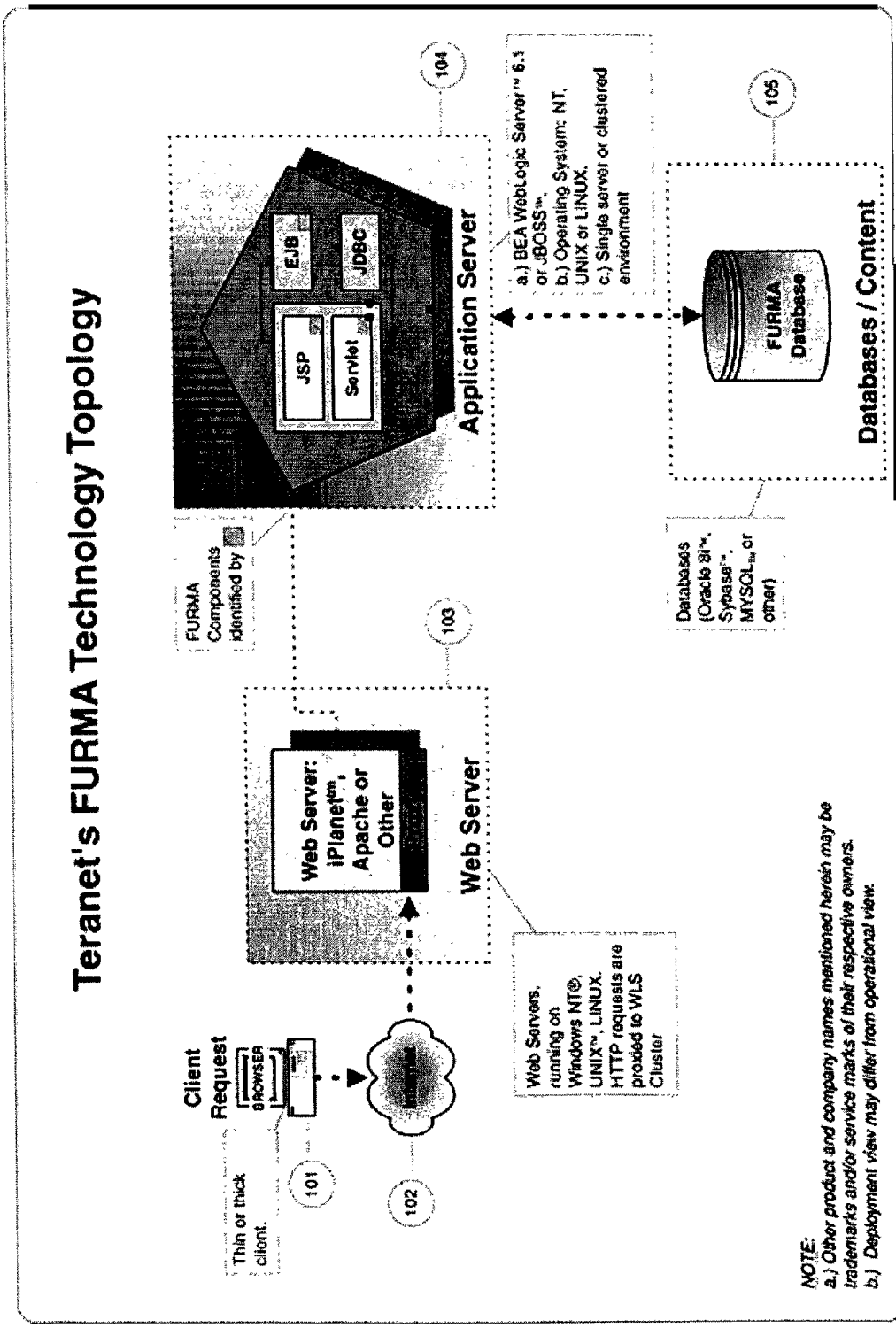
FIG. 1 is a diagram of a preferred hardware arrangement used to carry out the invention.

The framework may be run on various types of standard hardware. With reference to FIG. 1, a sample topology of the preferred hardware configuration is provided. The registration system is preferably installed in a typical client-server network. A single server or server cluster 104 will run the system components in communication with at least one database 105. Registration services provided through the localized application are preferably accessible to a thick or thin client system 101 over the Internet 102. In this embodiment, a web server 103 mediates client requests for registration services to be carried out on the application server 104.

Figure 3:
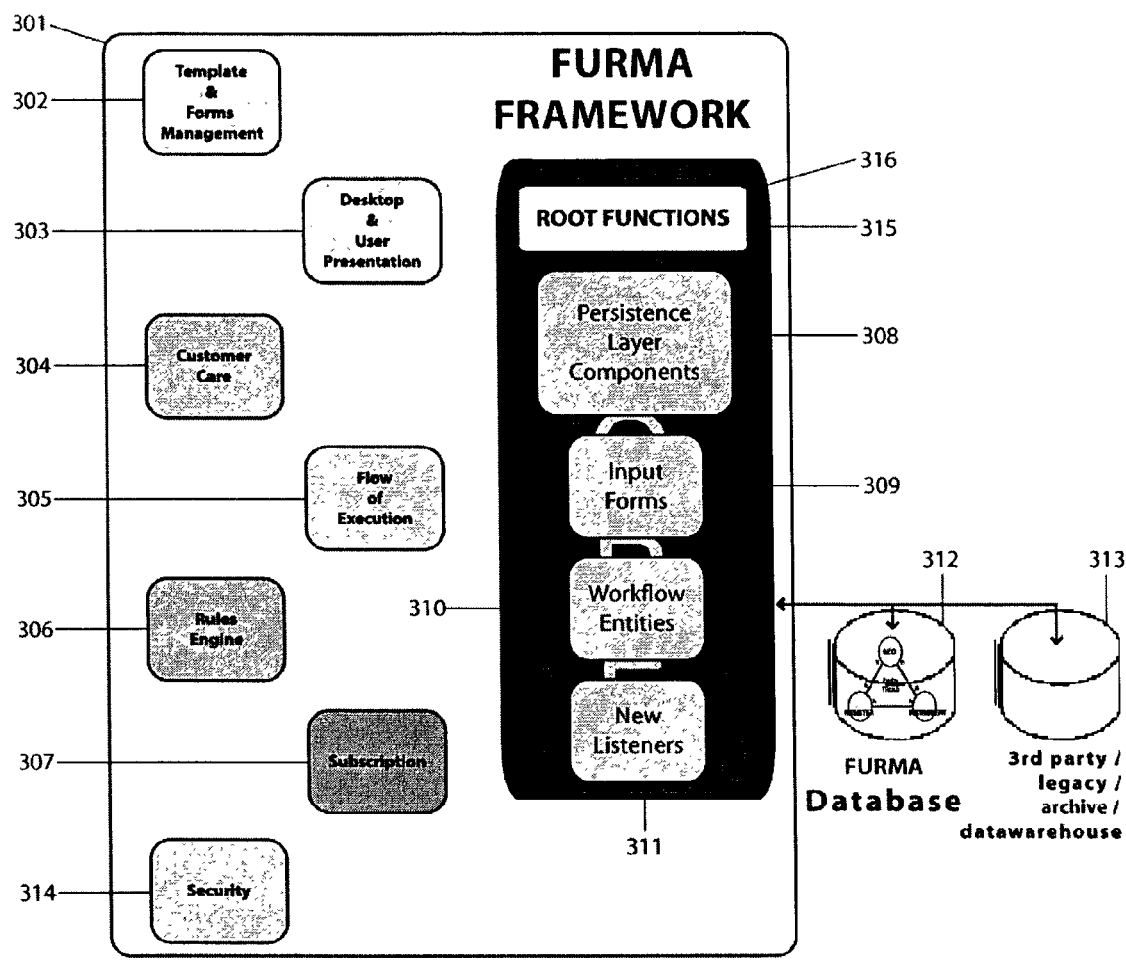
FIG. 3 is a schematic diagram of the modular framework thereof.

Turning to FIG. 3, the preferred framework 301 includes at least the following program modules, all of which are in communicative relationship to a core module 316 interfacing with at least one database 312:

Template & forms management 302
Flow of execution (workflow) 305
Rules engine 306

The Core module 316, in addition to its root functions 315, contains the components of the persistence layer 308, input forms 309, workflow entities 310 and new listeners 311, all as more particularly described elsewhere in this document.

Further functions or modules may include:

Desktop & user presentation (Presentation & grouping) 303
Customer care 304
Subscription 307
Security 314
Billing/pricing (not shown)
Data conversion (not shown)

The functions or modules may be provided either in the form of a discrete program module, or as an API (application program interface) interfacing with a third party application performing the desired function. For instance, the security module 314 may be provided by means of an API interfacing with a conventionally known encryption and/or digital signature application. The API passes the appropriate information to the third party application and returns appropriate information to the framework core 316 and its database 312.

The modules 301 enable the configuration of the localized registration application according to the custom requirements of the registration service provider. Once the registration system is localized for the provider's particular application, it may also be amended as necessary to meet changing requirements (e.g. regulatory or form changes) or to create new applications.

Figure 4:
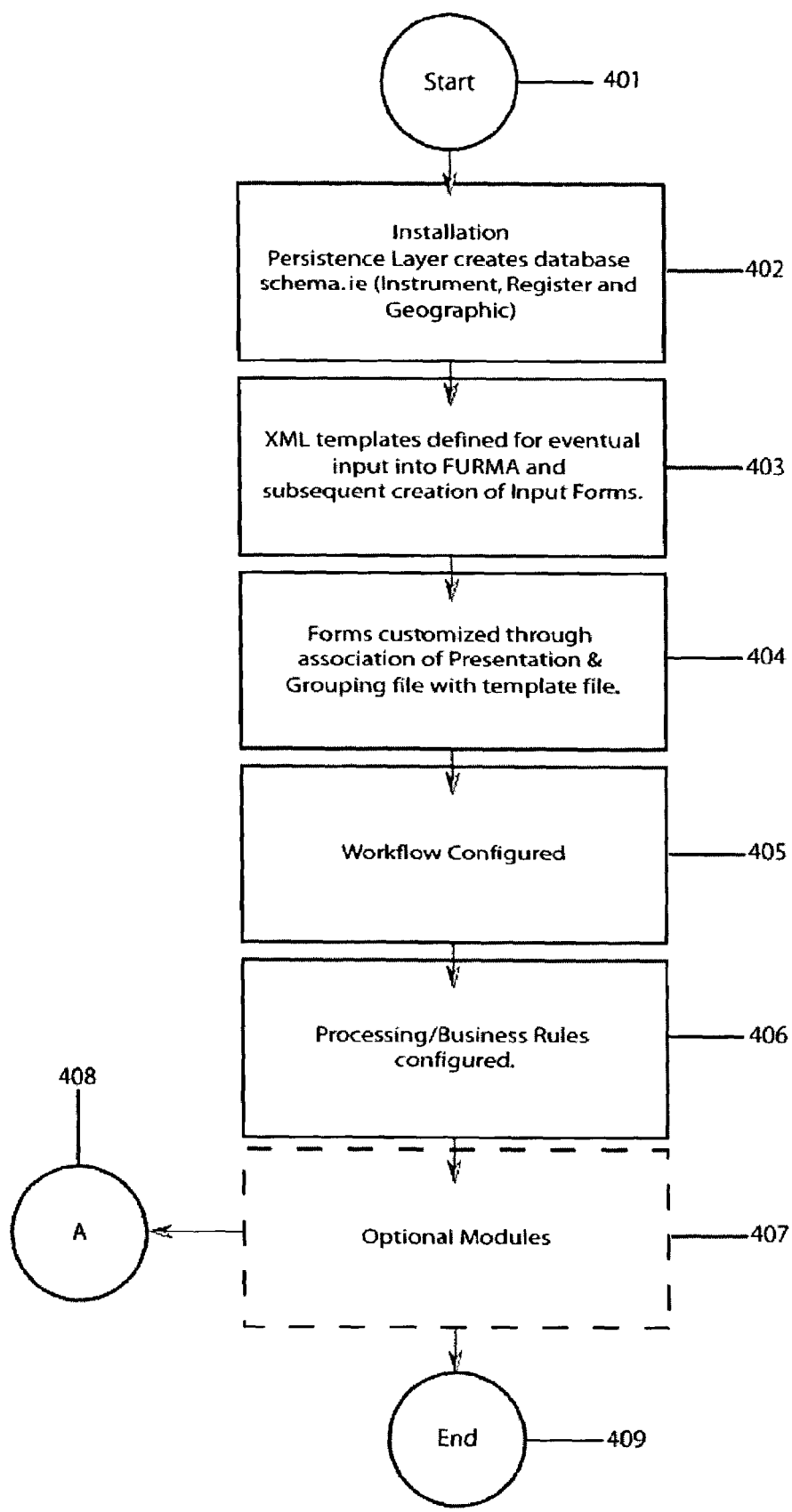
FIG. 4 is a flow diagram of a preferred embodiment of the method.
Figure 5:
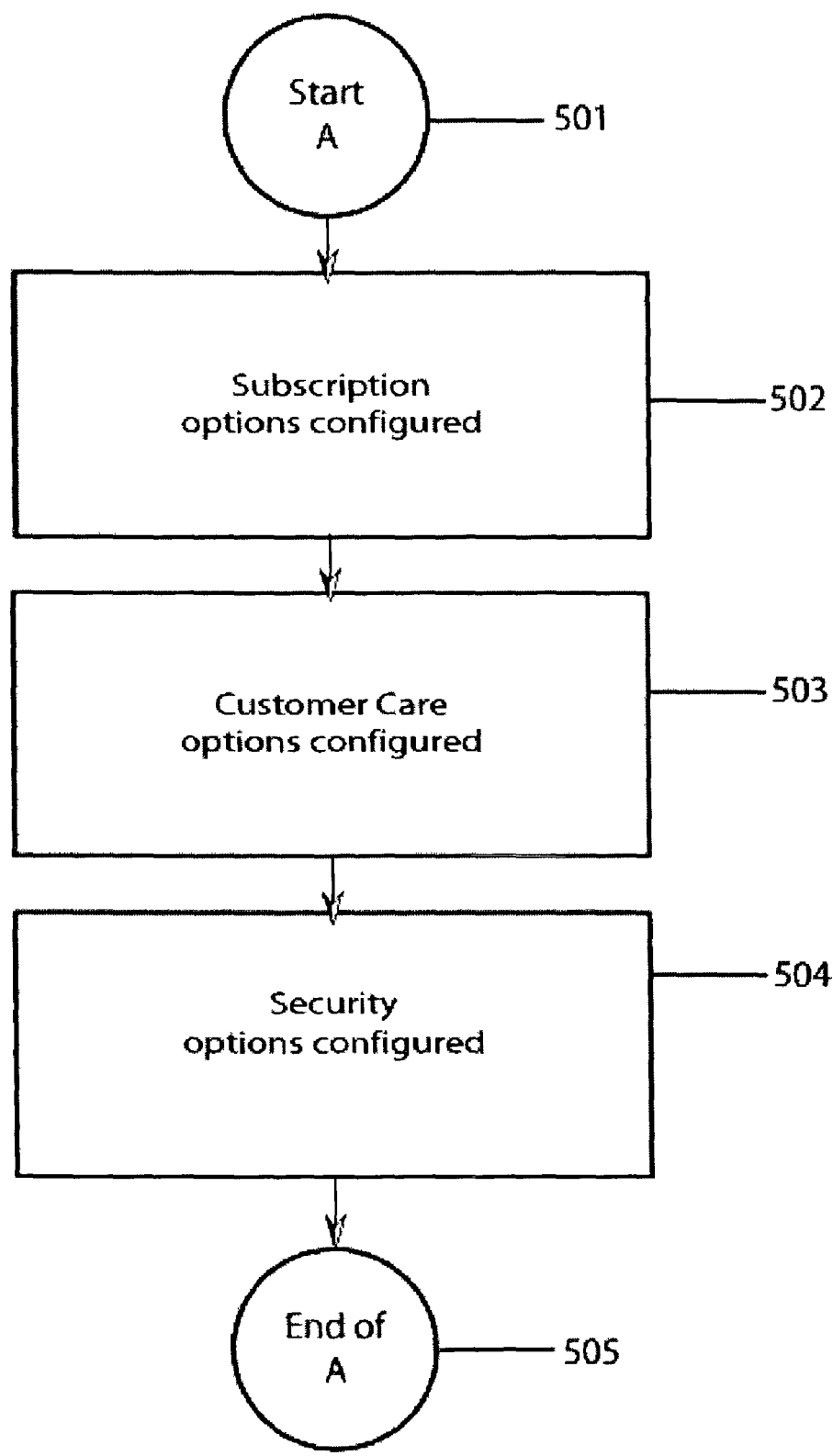
FIG. 5 is a flow diagram of process A according to the method.

The method is set out generally in flow charts provided in FIGS. 4 and 5. To localize a registration system through the generic framework, the provider must first install and configure the framework 402. The registration "system" is the localized application which runs through the "framework." In the installation, the persistence layer 205 within the framework 203 will create the database Instrument, Register and Geographic schema required. The persistence layer 205 will then use the schema for storage and retrieval. These database tables do not change in structure after the installation, however attributes may be added.

The database 312 once configured can be populated with legacy data 313 through a conversion utility (not shown) or left blank until the system is ready to be populated by new entries through the localized front-end system.

Once the framework is installed, templates are used to carry out the process of creating the forms required for registration 403. The templates are preferably defined or developed using XML Schema as prescribed by the W3C. Templates are used to define the forms required to input data into the Instrument, Register and Geographic data entities. Form field validation is defined as part of the template development phase. In the preferred embodiment, XML Schema allows field validation to be written into the form code.

Once a template is submitted, the framework automatically generates a resultant input form 403. Optionally, the form can be visually customized by associating a Presentation & Grouping file with the template 404, which allows the provider to select the precise layout of the form fields and to include any creative touches desired (such as custom background appearance, provider logo, etc.). This "P & G" file is preferably in XSLT.

Figures 10A, 10B:
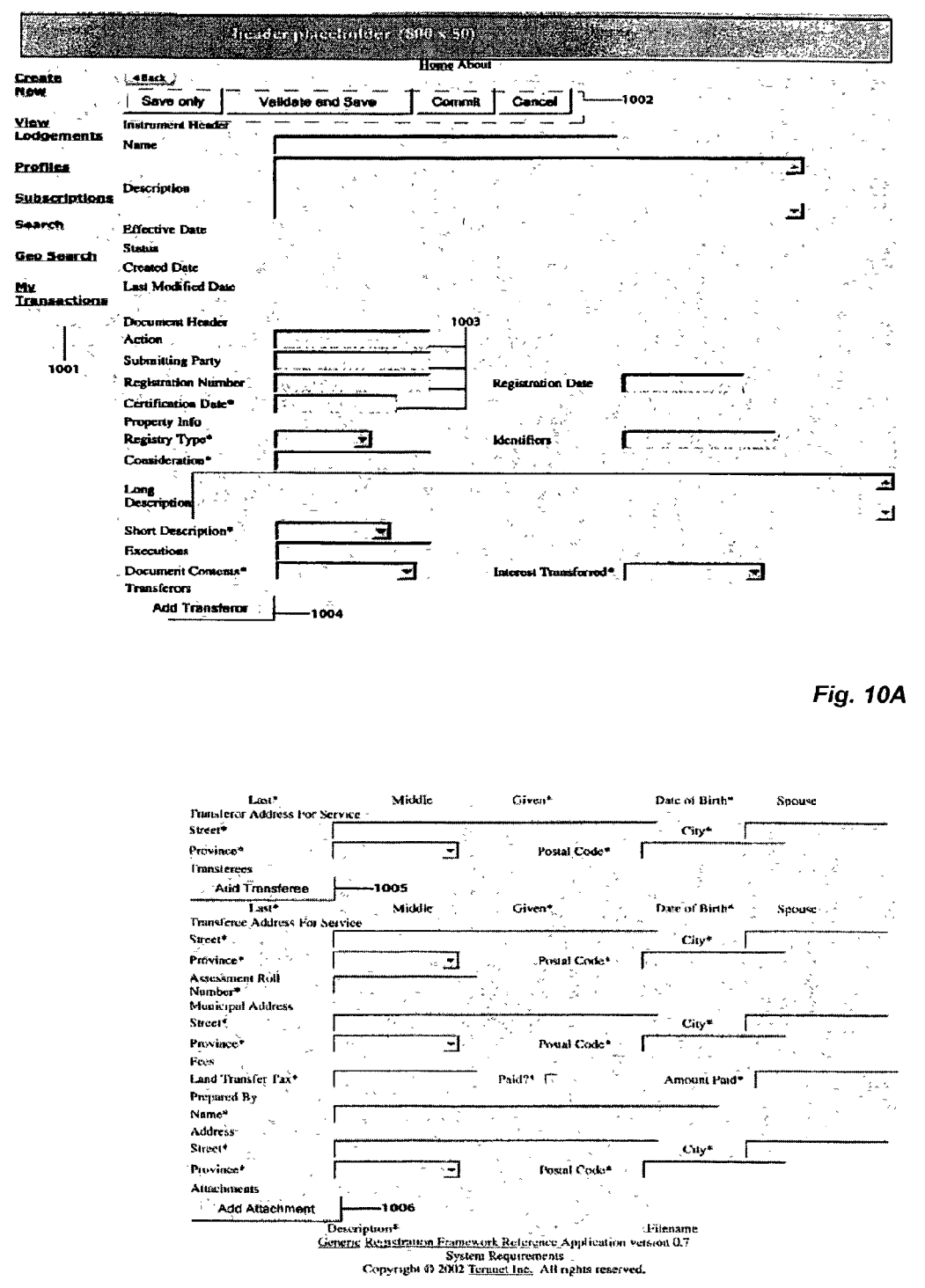

A sample form is shown at FIGS. 10A and 10B. According to fields defined in the template 403, the form will allow entry of various descriptive information 1003 in relation to the Instrument (in this case, a property transfer) for the particular Register (in this case, the property) and in relation to the Geographic. In this case, there are Geographic attributes of the property itself, the transferor 1005 and the transferee 1006. In this case, the form also permits an attachment file to be added (such as a survey of the property). Note that the sample screen shot of the form also shows form-related options 1002 defined to be available to the user (for saving an unfinished work to come back to, validating the contents, committing the input information for registration, or canceling the transaction). The localized application also includes user-related options 1001 to engage other processes available to the user (such as, checking the status of other registration transactions, setting subscription preferences, and searching the database).

At the same time 404, the provider can include its own static pages to be called by the application when it is presented to the user. Static pages are not generated by the framework via a template. However, these pages may access and present data stored within the database or from another data source. Static pages may be used to govern any process or information that is domain specific. For instance, logging-in, displaying data, reports, organization of submissions, folders, instruments, or user navigation functions may be provided by static pages.

Once the databases and forms are configured, the provider then configures the workflow module (Flow of Execution module 305) to establish the high-level order of operations for the registration process to be carried out 405. Certain standard registration operations can preferably be selected from among a pre-programmed set (such as, saving data, retrieving data, validating, searching, checking permissions), or the provider can define and include custom operations.

Figure 11:
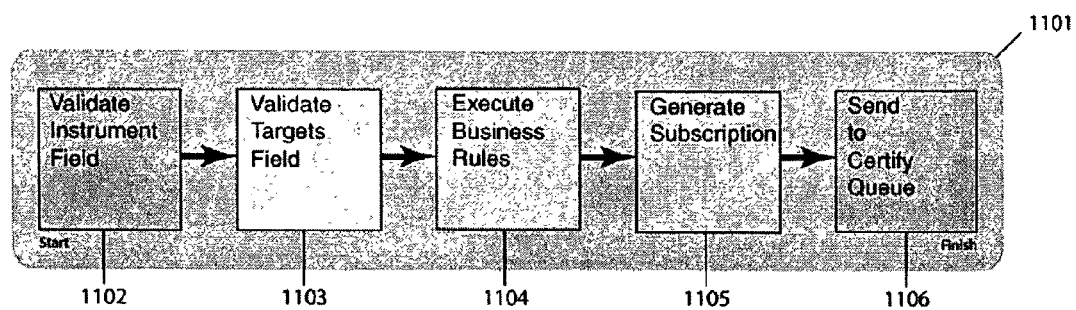
FIG. 11 is a sample workflow selected according to the method.

An example flow of execution 1101 is shown in FIG. 11. In the example, the selected registration process begins by validating the Instrument fields 1102 (i.e. the fields entered by user through the defined form). Then the targets fields 1103 are validated. The defined business rules will be executed 1104. Subscription options will be generated 1105. Finally, the information will be sent to be certified in queue order 1106.

At a detail level, each step in the workflow can be configured to apply rules defined by the provider using the Rules Engine 406. In order to set rules, the provider will preferably program Java objects that execute fine grained business logic which support the rules. These Java objects 310 will preferably reside in the Core 316 when defined. Some predefined objects 310 will preferably be available in the framework as installed. The objects are included in rules of preferably "If . . . Then . . ." syntax. Preferably, the syntax will be close to English syntax to permit ease of human comprehension.

Figure 12:
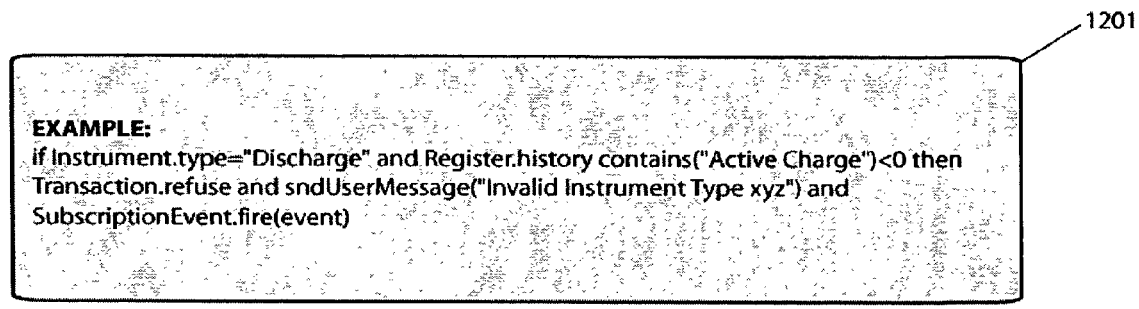
FIG. 12 is a sample rule defined according to the method.

An example of such a rule is provided in FIG. 12. The sample rule 1201 checks for active mortgages on a property title before registering a discharge. If there is an Active Charge in the history (having a value greater than 0), the registration transaction will be refused and the user will be sent a message. A "Subscription Event" is also triggered to notify other "listeners" 311 subscribed to receive messages for this particular Register (as set in the subscription module 307) that there was an attempted registration against this Register.

Code entities may also be developed to support specific complex operations (such as, pricing or fee calculation, data manipulation, business logic execution). The provider can also specify whether submitted forms are to be processed immediately, or batched for processing (such as, at the end of each business day).

These are the core requirements for localization of a registration system according to the preferred embodiment of the present method. However, there are several other possible localization steps 407 to generate a more sophisticated application.

Referring now to FIG. 5, optional steps 407 in the method are shown (these steps in any order). A subscription module 307 may preferably be employed 502 to define notice events for any person or process that may need to be aware of such events. System events (such as, start-up, shutdown, exception or any system logged events), or business events (such as, edit of instrument, change to register, payment on bill, execution of specific transaction or business process) may be selected as subscribable. Various modes of electronic communication are supported for dissemination of such notices. Other modes can also be defined as framework plug-ins.

A customer care module 304 may preferably be employed 503 to define groups and users authorized to transact with given information in the databases. Definition of groups or users involves setting a customer profile and customer permissions. "Users" in the present sense refers to users of the registration system, as opposed to the individuals who may be related to the entities within the databases (e.g. owners). When configured to permit multi-user access to a lodgement, several users may collaborate on information to be submitted for registration (e.g. lawyers on opposite sides of a transaction). In the lodgement process, information is stored for use in the collaboration without affecting the state of the registration database. One or multiple users may be required to commit the information to be registered. An identifier is preferably associated with the lodgement to allow users to return to unfinished work.

A security module 314 may preferably be provided 504 to provide encryption technology and/or digital signature technology to secure and authenticate communications on the system. The rules engine 306 is preferably employed to define what specific communications are to be encrypted, digitally signed, etc. The workflow module 305 is preferably employed to define at what point in the operations encryption will occur. Encryption can apply to all communications or specific parts of communications (i.e. one field or the entire document can be encrypted).

Optionally, a pricing/billing interface is provided for setting prices and collecting monies owed for a registration transaction.

The database of the preferred embodiment is preferably comprised of tables representing each of the Register, Instrument and Geographic entities. It has been found useful to represent each entity with a non-standard recursive table structure having preferably two tables: a component table and an attribute table. As each component is made up of a set of standard columns and rows, the database will contain a set of tables to represent each type of component and a table to represent the attributes. The number of attributes is therefore potentially unlimited, and the level of granularity can be modified to suit the application.

For searchability, there is preferably a join between component table and attribute table, and a recursive join on the attribute table.

Sample tables are shown in FIGS. 6 through 8 to illustrate a possible schema for a land registration application. With reference to the sample Instrument tables in FIG. 6, two tables are provided—a component table 601 and an attribute table 620. There are multiple entries in each table 602-619, 621-645. The component entries represent actions taken against an object in the Register. As a sample Instrument entry in the component table 601, 602 is identified as a "ChargeorMortgage" type having name "123". This entry relates to a number of entries in the corresponding attribute table 620 identified at entries 621-625. That is, the "ChargeorMortgage" component has five attributes. Among these, for instance, the change has an attribute "principal Amount" 625 which has a value of "645" in this case. The attribute types correspond to standard variable types (e.g. "string" type or "double" numeric type).

Similarly, FIG. 7 shows component 701 and attribute 710 tables for a sample Register. The Register in this case lists properties 702, 703. "Property B" (ID "102") in the component table 701 has a number of attributes 711-718, including owner's name 713 and spouse's name 712, as well as, address attributes 714-718.

FIG. 8 shows component 801 and attribute 820 tables for a sample Geographic. The Geographic in this case contains a number of descriptors 802-811. Each descriptor type is defined with a Geotype which represents its level in the hierarchy. Although five levels are provided in the example, any number of levels may be defined to suit the particular application. Component "street" 805 has four attributes 821-824 relating in this case to the number and location of wells on that street.

Preferably, the database 312 is configured to automatically log and effective date all entries (even where the attributes have changed). This helps to preserve the record-keeping integrity of the system and allows historical querying and reporting.

The foregoing is considered as illustrative only of the principles of the invention. Further, since numerous modifications and changes will readily occur to those skilled in the art, it is not desired to limit the invention to the exact steps and systems shown and described, and accordingly, all suitable modifications and equivalents may be resorted to, falling within the scope of the invention and the appended claims and their equivalents.

What is claimed is:

1. A method for localizing an electronic registration system provided through a generic registration framework, the registration system having register, instrument and geographic entities within a database in a computer memory, the method comprising:

defining the register, instrument and geographic entities to be stored in the database:
(i) wherein the register entity is configured to store registration data relating to an object, the instrument entity is configured to store registration data relating to an interest in or an action taken with respect to the object, the geographic entity is configured to store registration data relating to a geographic attribute of an entity or a geographic attribute of an attribute of an entity, and
(ii) wherein the register, instrument and geographic entities are defined through a capturing interface, and further wherein the capturing interface includes a persistence layer for permitting changes to be made to the database dynamically;

defining data fields in the database for the register, instrument and geographic entities, wherein the data fields are defined or expressed in XML;

defining input parameters to accept input information through forms;

selecting an order of registration operations to be performed on the input information;

defining rules for processing the input information to be applied against an attribute of any one of the register, instrument and geographic entities; and storing, as the localized electronic registration system, the defined register, instrument, geographic entities, and input parameters, and the selected order of registration operations and defined rules for processing the input information.

2. The method of claim 1, wherein the step of defining register, instrument and geographic entities further includes populating data fields for the register, instrument and geographic entities with existing data.

3. The method of claim 1, wherein the geographic entity includes a hierarchically-expressed geographic indicator.

4. The method of claim 3, wherein the geographic indicator has a dynamically selected number of levels.

5. The method of claim 1, wherein the step of defining register, instrument and geographic entities further includes linking existing systems to the register, instrument and geographic entities.

6. The method of claim 1, wherein the step of defining input parameters further includes defining the presentation and grouping of the forms.

7. The method of claim 1, wherein the step of selecting an order of registration operations further includes selecting from among predetermined business objects.

8. The method of claim 1, wherein the step of defining rules further includes defining business objects to serve as arguments for the rules.

9. The method of claim 1, wherein the step of defining rules further includes selecting predefined business domain objects for use in defining rules.

10. The method of claim 1, wherein the step of defining rules further includes defining rules with an English grammar.

11. The method of claim 10, wherein the rules are defined using an "if . . . Then . . . " syntax.

12. The method of claim 1, wherein the method further includes setting prices and collecting monies owed for a registration transaction by means of a subscription module.

13. The method of claim 1, wherein the method further includes defining and delivering messaging events by means of a subscription module.

14. The method of claim 1, wherein the method further includes defining security protocols to be applied to input information by means of a security module.

15. The method of claim 1, wherein the method further includes authorizing users or groups to input, edit, or delete information by means of a customer care module.

16. The method of claim 1, wherein each one of the register, instrument and geographic entities includes a component table and an attribute table to be stored in the computer memory.

17. The method of claim 1, wherein the input parameters are defined through a template interface.

18. The method of claim 1, wherein the order of registration operations are selected through a workflow interface.

19. The method of claim 1, wherein the rules for processing the input information are defined through a rules interface.

* * * * *